(No Model.)
H. EARLE.
AUTOMATIC GRAIN SCALES.
No. 422,747. Patented Mar. 4, 1890.
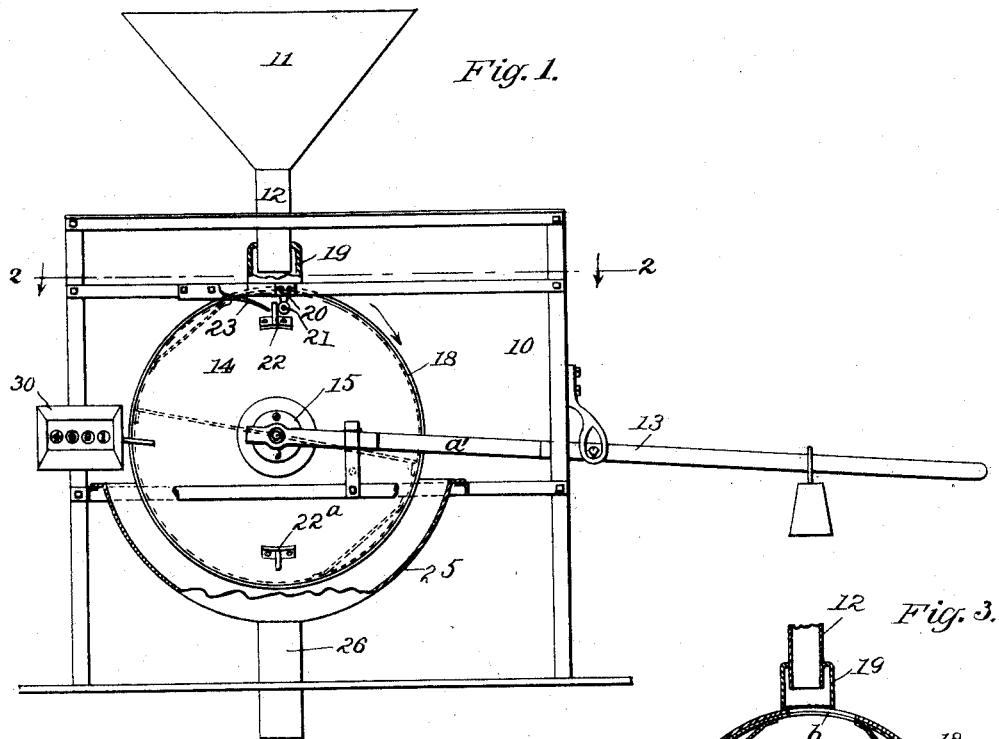
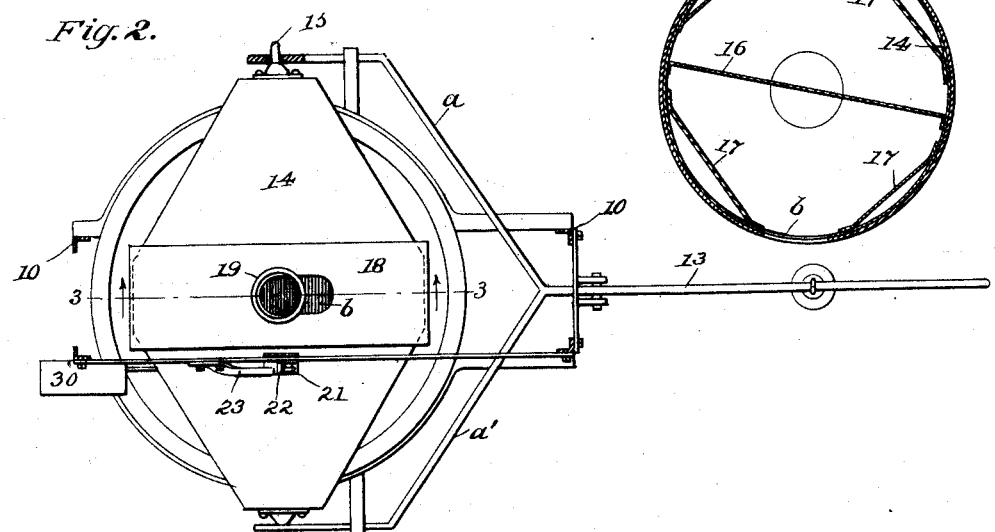
WITNESSES:
J. A. C. Criswell
C. Sedgwick
INVENTOR:
H. Earle
BY Munn & Co.
ATTORNEYS.
N. PETERS, Photo-Lithographer, Washington, D. C.

UNITED STATES PATENT OFFICE.

HENRY EARLE, OF CAÑON CITY, COLORADO.

AUTOMATIC GRAIN-SCALES.

SPECIFICATION forming part of Letters Patent No. 422,747, dated March 4, 1890.

Application filed August 7, 1889. Serial No. 319,978. (No model.)

*To all whom it may concern:*

Be it known that I, HENRY EARLE, of Cañon City, in the county of Fremont and State of Colorado, have invented new and Improved Automatic Grain-Scales, of which the following is a full, clear, and exact description.

This invention relates to automatic grain-scales, the object of the invention being to provide an extremely simple, cheap, and durable scale of the description above referred to; and to the end named the invention consists in the particular construction and combination of parts as hereinafter fully described, and pointed out in the claims.

Reference is to be had to the accompanying drawings, forming a part of this specification, in which similar figures and letters of reference indicate corresponding parts in all the views.

Figure 1 is a side view of my improved automatic grain-scales, parts being broken away. Fig. 2 is a plan view of the scales, the frame being shown in section on the line 2 2 in Fig. 1; and Fig. 3 is a central cross-sectional view of the drum and a portion of the hopper-spout, taken on the line 3 3 in Fig. 2.

In the drawings, 10 represents the main frame of the scales, above which there is mounted a hopper 11, having a delivery-spout 12, provided with a suitable slide or valve. A scale-beam 13, having a bifurcated forward end, is supported by the frame 10, and between the arms $a$ and $a'$ of the bifurcated end of the scale-beam 13 there is mounted a drum or receiver 14, having outwardly-extending trunnions 15, that ride loosely in bearings formed in the arms $a$ and $a'$.

The drum 14 has conical ends, and is divided into two or more (preferably into two) compartments by a partition 16, which is at an angle to a horizontal plane when the drum is in its receiving position, and on both sides of each compartment I arrange deflecting-plates 17, which extend from a point in close proximity to the diaphragm 16 to a point in close proximity to the discharge-openings $b\ b$. By forming the drum with conical ends the weight will be thrown to the center of the drum in line with the scale-beam, so that the scale-beam is prevented from rocking laterally on its support. By this construction, also, the inlet-opening has to be confined to the center of the drum, thereby facilitating access to the entering-spout from all sides. It also facilitates the discharge of the grain from the drum.

To the outer face of the drum 14 there is secured a metallic band 18, the face of which is by preference substantially parallel with the drum-axis. Said band is provided with apertures corresponding with the openings leading to the compartments of the drum, and upon the band rests a movable sleeve 19, which partially incloses the delivery-spout 12, the bottom of the sleeve resting directly upon the band 18, or the sleeve might be provided with any yielding material about its lower edge, which material would rest upon the band, the idea being to prevent the discharge of grain at times when the drum is moving, as will be hereinafter explained.

One of the cross-bars of the frame 10 carries a bracket 20, upon which there is mounted an anti-friction roll 21, and to the face of the drum there are secured stops 22 and $22^a$, which bear against the roll when the drum is in the receiving position. In connection with the anti-friction roll 21 I arrange a spring-stop 23, which prevents any retrograde movement of the drum. If deemed desirable, friction-rolls may also be placed on the stops 22 and $22^a$.

Beneath the drum 14 is mounted a hopper 25, having a discharge-spout 26.

In operation grain is fed into the hopper 11, passing thence downward through the spout 12 through one of the openings $b$ and into the drum. Then when sufficient grain has entered the drum to overbalance the weight carried by the beam 13 the drum will move downward, the stop 22 at this time bearing against the roll 21, which prevents any undue friction. Immediately after the stop has cleared the anti-friction roll 21, the preponderance of the weight of the grain being to the right, the drum will turn in the direction of the arrow shown in connection therewith, and the grain will be discharged into the hopper 25, the rotation continuing until the stop $22^a$ is arrested by the roller 21, and as the drum revolves, the sleeve 19, bearing upon the face of the band 18, will prevent any escape of grain from the hopper 11 until the second port $b$ comes in register with the sleeve. As the drum revolves, the stops 22 and 22ª actuate a recording device 30, such recording device being of any of the well-known constructions.

Having thus described my invention, I claim as new and desire to secure by Letters Patent—

1. In automatic scales, the combination, with a scale-beam, of the receiving-drum 14, having conical ends and divided into two compartments by a partition 16, which is at an angle to a horizontal plane when the drum is in its receiving position, the drum being provided with diametrically opposite openings, one for each compartment, and the ends of the drum with trunnions by which it is journaled in the said beam, substantially as described.

2. In automatic scales, the combination, with the scale-beam 13, having the arms a, of the double conical drum 14, journaled in the said arms, divided into two compartments by the partition 16, which is at an angle to a horizontal plane when the drum is in its receiving position, and provided with an opening for each compartment, the band 18, surrounding the drum and having openings corresponding to the openings of the drum, and the deflecting-plates 17 on the inside of the drum, substantially as herein shown and described.

HENRY EARLE.

Witnesses:
HUNTER PALMER,
WILLIE H. PEABODY.